(12) United States Patent
Darnell

(10) Patent No.: US 10,787,802 B2
(45) Date of Patent: Sep. 29, 2020

(54) DISCHARGE ABATEMENT SYSTEM

(71) Applicant: Randy R. Darnell, Ortonville, MI (US)

(72) Inventor: Randy R. Darnell, Ortonville, MI (US)

(*) Notice: Subject to any disclaimer, the term of this patent is extended or adjusted under 35 U.S.C. 154(b) by 0 days.

(21) Appl. No.: 16/113,459

(22) Filed: Aug. 27, 2018

(65) Prior Publication Data
US 2019/0071858 A1    Mar. 7, 2019

Related U.S. Application Data

(60) Provisional application No. 62/553,262, filed on Sep. 1, 2017.

(51) Int. Cl.
*E03F 5/16* (2006.01)
*C02F 1/40* (2006.01)
*B01D 17/02* (2006.01)
*C02F 103/32* (2006.01)

(52) U.S. Cl.
CPC ............ *E03F 5/16* (2013.01); *B01D 17/0211* (2013.01); *C02F 1/40* (2013.01); *C02F 2103/32* (2013.01); *C02F 2201/005* (2013.01); *C02F 2209/40* (2013.01)

(58) Field of Classification Search
None
See application file for complete search history.

(56) References Cited

U.S. PATENT DOCUMENTS

| | | | | |
|---|---|---|---|---|
| 3,841,487 A | * | 10/1974 | Villette | E04H 4/1272 210/123 |
| 5,030,357 A | * | 7/1991 | Lowe | B01D 17/00 210/669 |
| 5,266,191 A | * | 11/1993 | Greene | B01D 21/0039 210/195.1 |
| 5,411,665 A | * | 5/1995 | Scraggs | C02F 3/343 210/610 |
| 6,010,634 A | * | 1/2000 | Sams | B01D 17/0208 210/801 |

* cited by examiner

*Primary Examiner* — Richard C Gurtowski
(74) *Attorney, Agent, or Firm* — Harness Dickey

(57) ABSTRACT

Disclosed is a containment system that may assist in abating discharge into a fluid stream. The abatement may be installed in selected locations to initially abate flow of a fluid from a first container to an outlet system or volume.

14 Claims, 12 Drawing Sheets

DISCHARGE ABATEMENT SYSTEM

CROSS-REFERENCE TO RELATED APPLICATIONS

This application claims the benefit of U.S. Provisional Application No. 62/553,262, filed on Sep. 1, 2017. The entire disclosure(s) of (each of) the above application(s) is (are) incorporated herein by reference.

FIELD

The present disclosure relates to a discharge abatement system, and particularly to a discharge flow control system.

BACKGROUND

This section provides background information related to the present disclosure which is not necessarily prior art.

Often a fluid is caused or initiated to flow from a first location to a second location. Generally the fluid is directed to flow through various and selected pathways and pipe ways. In various applications, the fluid is subjected to various filtration and settlement or cleaning systems or methods.

In various applications, such as kitchens, food preparation stations, cooking areas, and the like, a fluid may flow from an area having an amount of non-aqueous material, such as fat, oil, or grease. It is desirable to collect the non-aqueous material prior to allowing the flow to enter a common sewer or other waste system.

For example, in a commercial kitchen a commercial sink may have a capacity, such as a large volume. The sink may be used for food preparation, food cleaning, dish cleaning, and the like. Therefore, both water and other aqueous material may mix with grease and fat. The volume of the sink may then be emptied into a sewer away line. Placed in the sewer line prior to the primary or common sewer line, may be a grease trap or grease interceptor. Grease interceptors may include the Trapzilla® grease interceptor or grease trap sold by Thermaco Inc. having a place of business in Asheboro, N.C. The grease interceptor may operate efficiently or only operate at all at a selected flow rate. Given the flow rate for operation of the grease interceptor, therefore, an overflow of the initial sewer line may occur if a large volume is emptied into a sewer line. The greater the initial volume and/or the greater of the flow rate prior to the grease interceptor, the greater the chance for a backflow or a stoppage of flow into the initial line given the flowrate through the grease interceptor.

SUMMARY

This section provides a general summary of the disclosure, and is not a comprehensive disclosure of its full scope or all of its features.

An initial containment volume control or discharge abatement system is disclosed. The abatement system includes a volume to collect an initial discharge of a fluid from a work containment volume, such as a sink, basin, roaster, or the like. The abatement system or containment system may then be provided to control flow of the fluid from the initial discharge location to an initial sewer line or internal sewer line to ensure proper operation of downstream systems. For example, the initial containment or abatement system may control flow of a fluid from the initial discharge location through the initial sewer line such that a grease interceptor or grease trap is able to operate at an efficient flowrate. Accordingly, the sewer line is provided to not overflow or back up given the controlled flowrate of the fluid discharge through the sewer line into various collection systems, such as a grease interceptor, floor sink, or the like.

The abatement system further includes one or more inlets that is able to accept a high flowrate into the abatement system volume. The abatement system volume may be enclosed to contain a selected volume of liquid. Further, the abatement system may include an outflow control system to allow liquid to flow from the abatement volume to the sewer line.

The abatement system may further include control mechanisms, such as a splash control mechanism, a suds control mechanism, and the like. The control mechanisms may direct flow and control flow of liquid through the abatement volume to assist in reducing suds build-up and creation thereof thus ensuring flow through the control system.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
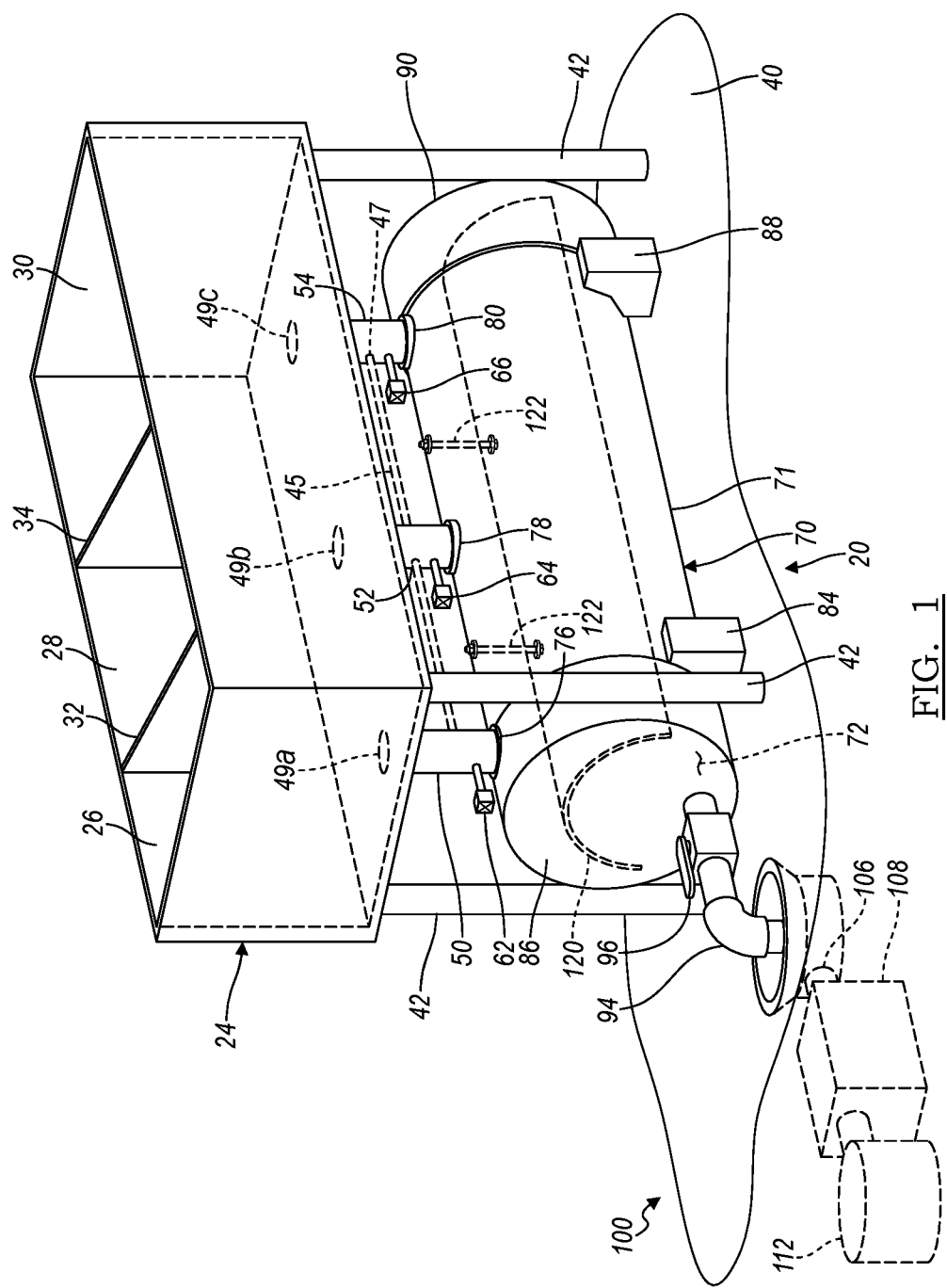
FIG. 1 is a schematic environmental view of a discharge containment and/or abatement system, according to various embodiments.
Figure 2:
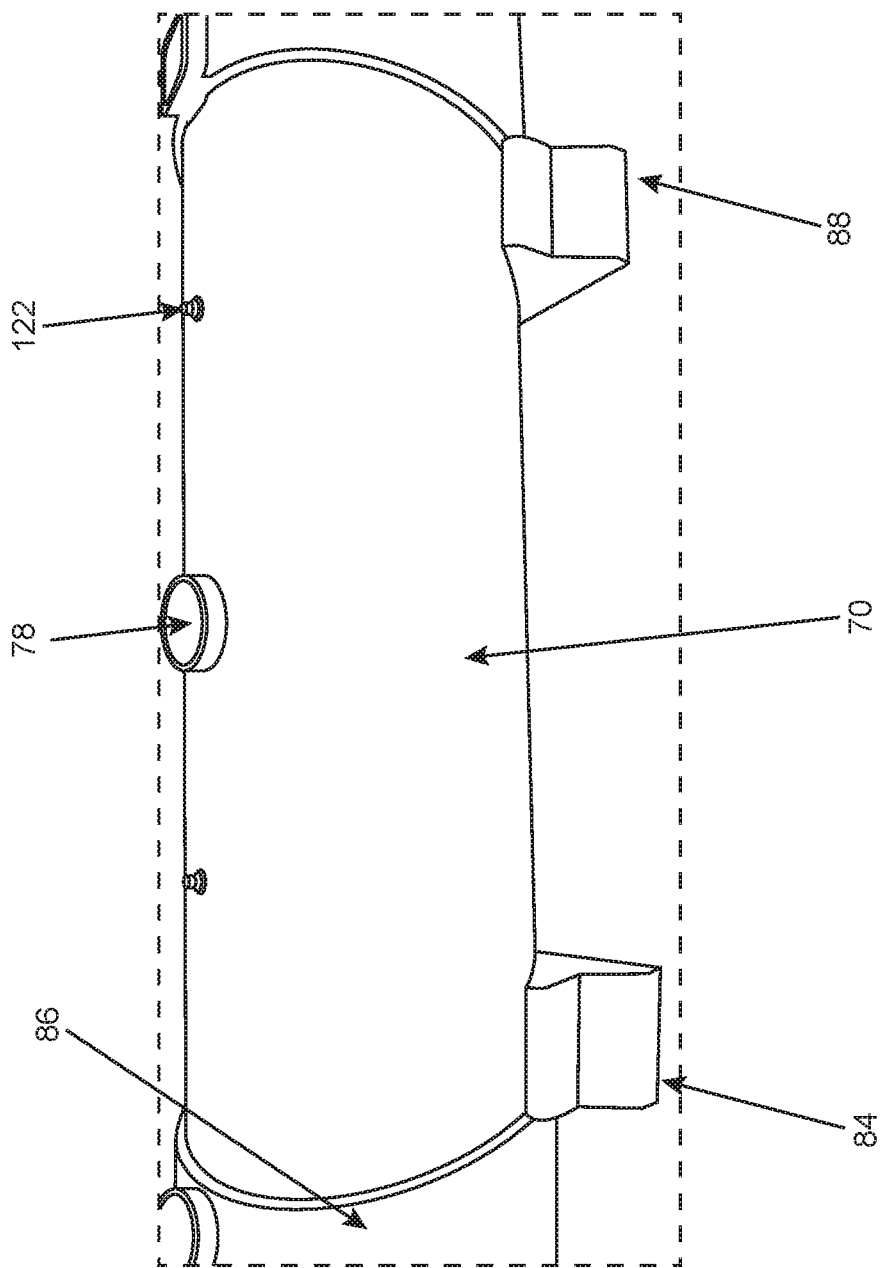
FIG. 2 is a perspective top view of the abatement system of FIG. 1.

With initial reference to FIG. 1 a containment system 20 is illustrated. The containment system 20 may also be referred to as an abatement system or a discharge abatement system, herein. Generally, the containment system 20 is positioned relative to a work volume container 24, such as a kitchen sink, commercial kitchen sink, food preparation station, roaster, or the like. The work volume container 24 generally includes one or more basins 26, 28, and 30. Each of the basins may be separated by various structures, such as internal walls 32 and 34. Each of the basins 26, 28, and 30, may include a volume that is about 30 liters. Accordingly, the volume of the container 24 may be about 80 to about 100 liters, including about 85 to about 95 liters. It is understood, however, that the container 24 may include a volume that is higher than about 100 liters or less than about 80 liters. Further, it is understood that the volume of the container 24 may be varied depending upon the dimensions of the container 24. Further, each of the basins, 26, 28, 30, may be of various sizes depending upon applications such as an institutional commercial kitchen, a large commissary, or a small restaurant.

Generally, the container 24 is elevated above a floor or surface 40 by one or more legs 42. The container 24 further includes one or more drains or drain nozzles 50, 52 and 54. Each of the drain nozzles may be operated to drain a volume of a fluid from each of the basins 26, 28, and 30. In various embodiments, a common drain line or conduit 45 may connect each of the basins 26, 28, and 30 and/or each of the drains 50, 52, and 54 to drain through a common or single conduit drain end 47. Each of the basins 26, 28, and 30 and/or each of the drains 50, 52, and 54 has a related trip lever 49a, 49b, and 49c. When a respective one of the trip leavers 49a, 49b, and 49c is opened the respective one of the basins 26, 28, and 30 drains into the conduit 45. Thus, if all of the trip leavers 49a, 49b, and 49c are opened, all of the basins drain 26, 28, and 30 through the single conduit end 47. The single conduit end may empty or drain into the container system 20, as discussed herein.

It is understood, however, that in addition to the single conduit end 47, or alternatively thereto, each of the drains 50, 52, and 54 may include separate drain valves. For example, the drain 50 may include a valve 62, the drain 52 may include a valve 64 and the drain 54 may include a valve 66. Accordingly, each of the basins 26, 28, 30, may be drained individually with the respective individual valve 62, 64, 66. Therefore, it is understood that the container 24 may be designed, built, and/or operated to drain all of the basins 26, 28, 30, simultaneously through the single conduit 45 and the conduit end 47 or in a selected manner with the individual valves 62, 64, 66. The drains 50, 52, 54, may drain into the containment system 20. It is further understood that the valves 62, 64, and 66 may be any appropriate drain mechanism or valve, such as a trip leaver, ball valve, etc.

With continuing reference to FIG. 1 and additional reference to FIGS. 2-10, the containment system 20 includes a container 70 having an exterior wall 71 that defines or forms an internal volume 72, as discussed further herein. The container 70 may be designed and sized to fit substantially between the legs 42 of the container 24 and have one or more openings in line with the drains 50, 52, 54, to receive fluid from the respective basins 26, 28, 30. Accordingly, a first opening 76 may be positioned adjacent, such as substantially below the drain 50. A second opening 78 may be positioned substantially below the drain 52 and a third opening 80 may be positioned below the third drain 54. Each of the openings 76, 78, 80, may be positioned as such that they are gravity fed from the fluid from the respective basins 26, 28, 30. Accordingly, having the openings 76, 78, 80, below the respective drains 50, 52, 54, allows for gravity to pull the fluid from the respective basins 26, 28, 30, through the respective drains 50, 52, 54, into the respective openings 76, 78, 80. It is understood, however, that various fluid movement systems, such as fluid pumps, may also be provided to move the fluid from the drains to one or more openings in the containment system container 70. Therefore, the containment system 20 need not be placed directly below the container 24. The containment container 70, therefore, may be positioned adjacent to, a distance from, or otherwise, relative to the container 24.

The containment system 20 may further include one or more leg or stabilizer extensions or member. For example, a first stabilizing member 84 may be positioned near a first end wall 86 of the container 70. A second stabilizer member 88 may be positioned near a second end wall 90 of the container 70. As discussed herein, the stabilizing members 84, 88 may be positioned over, under, in contact with, incorporated into end caps of the container 70, or otherwise appropriately associated with the containment system 20. In various embodiments, the stabilizing members 84, 88 may include portions that form the respective first end wall 86 and second end wall 90. The end walls 86, 90, for example, may be formed as caps that are connected to the wall 71 of the container 70.

Figure 3:
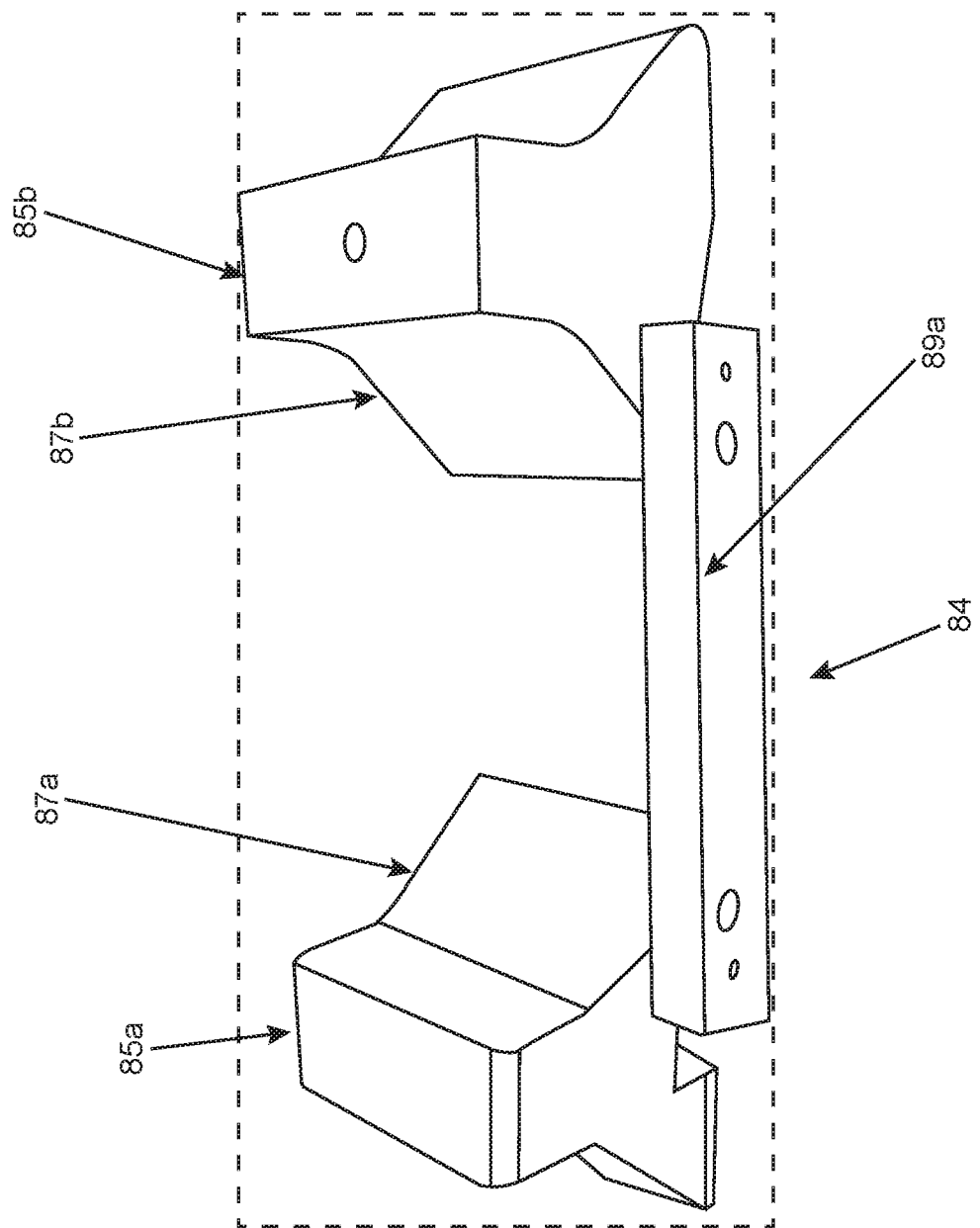
FIG. 3 is a top perspective view of a stabilizer system of the discharge containment and/or abatement system.
Figure 4:
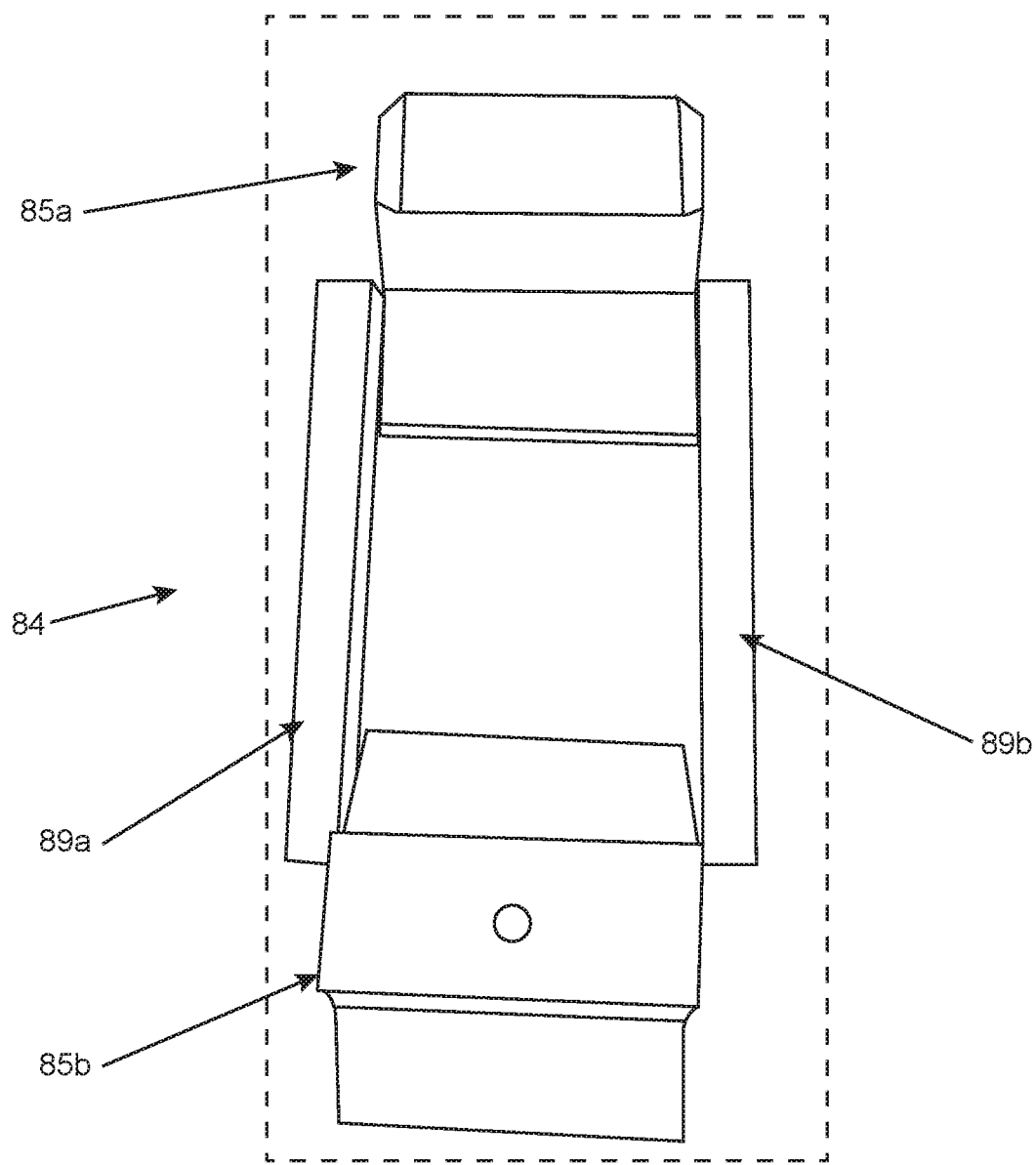
FIG. 4 is a top view of the stabilizer system of the discharge containment and/or abatement system.

Turning reference briefly to FIGS. 3 and 4, the stabilizer 84 is illustrated. It is understood by one skilled in the art, that the stabilizer 88 may be substantially similar or identical to the stabilizer 84; therefore only the first stabilizer 84 will be discussed in detail with reference to FIGS. 3 and 4. The stabilizer 84 includes a first foot or ground engaging member 85a and a second foot or ground engaging member 85b. Each foot 85a, 85b has a wall or container contacting surface 87a, 87b. The container contacting surface 87a, 87b may be shaped and/or contoured to contact in a snug or tight engaging manner the surface 71 of the container 70 or other appropriate portion of the container 70 or end portions to resist movement of the container system 20. The feet 85a, 85b may be connected with one or more connection members 89a, 89b. The connection members 89a, 89b substantially fix or hold the feet 85a, 85b relative to one another when force is applied to the walls 87a, 87b by the container 70.

A drain pipe or passage 94 may extend through the end wall 86 to communicate between internal volume 72 and an external volume or space. The outlet line or pipe 94 may include a flow control member 96. The flow control member 96 may be a generally known flow control system or member such as a FBV-4 or FBVS-4 ball valve sold by Watts Water Technologies, Inc., having a place of business at Andover, Mass. The flow control member 96 may ensure that only a selected flow rate of fluid leaves the containment container 70. The selected flow rate of the fluid leaving the containment container 70 may be selected and controlled to be less than a flowrate of the fluid entering the containment container 70. The outlet pipe 94 directs the fluid to a selected location, such as an initial sewer or away system. The initial away system 100 may include various items such as a floor sink 104. The floor sink 104 may be any appropriate floor sink, such as those generally known in the art. A fluid connection 106 may connect the floor sink 104 with a trap or collection system, such as a grease interceptor 108. The fluid from the containment container 70, therefore, flows from the internal volume 72 through the initial away system 100 including the interceptor 108. After the interceptor 108, the fluid may flow to various other filter or collection systems and/or may empty into a community sewer system, also referred to as a sanitary sewer system, 112.

The containment system 20 may further include an internal baffle assembly or member 120. It is understood that the internal baffle 120 is not required for the abatement system 20, but may operate to assist in operation thereof. The baffle system 120, as discussed herein, may assist in operation of the abatement system and efficient operation of downstream systems, such as the grease interceptor 108.

The internal baffle assembly 120 may be mounted and held to the containment container 70 by one or more hanger 122. The hangers 122 may include a bolt 124 that has a head 126 that engages the internal baffle 120 and a shaft 128 that extend or passes through or engages an external surface 130 of the container wall 71. In various embodiments, a nut 132 engages the shaft 128 to hold the bolt 124 in place relative to the wall 71. A spacer member 134 may be positioned over the shaft 128 to space the baffle member 120 from an internal surface 136 of the container wall 71. It is understood that a plurality of the hangers 122 may be included, such as two or more of the hangers 122. Each of the plurality of the hangers 122 may be substantially identical and may be spaced along a longitudinal length of the baffle 120 in the container 20.

The containment system 20 may include a plurality of openings 76, 78, and 80. The openings 76, 78, and 80 are formed through the container wall 71 to allow access from an external area or volume to the internal volume 72. The openings 76, 78, 80, may each include or have extending therefrom a drain guide or flow guide member. For example, the first opening 76 may include a first guide 140 that extends through the container 70 at least from the opening 76 to a position near or adjacent to the baffle 120. For example, the guide 140 may include a terminal portion or end 142 that is near or in contact the baffle 120. The guide 140, however, near the terminal end 142 may include a scallop, chamfer, or other cutout or open portion 144 to allow material to pass from the guide 140 around the baffle 120. For example, the guide may include a cylindrical pipe that is about 6 to about 9 centimeters in diameter including about 7.6 centimeters in diameter. The chamfer may include a semicircular or hemispherical cut formed around or near the terminal end 142. In various embodiments, the terminal end 142, therefore, may be scalloped and only a selected portion of the terminal end 142 contacts or is nearer the baffle 120 than other portions.

Each of the openings 76, 78, 80 may further include guides such as the second opening 78 including a guide 150 that includes a terminal end 152 that may be scalloped, as discussed above, and include a passage open portion 154. The third opening 80 may also include a guide 160 that includes a terminal end 162 that is scalloped to form an opening 164. Therefore, each of the openings 76, 78, 80, may include respective guides 140, 150, 160 to guide a flow of fluid into the container 70 of the containment system 20. The fluid flowing into the containment system 20 may then engage the baffle 120 as the fluid flows generally in the direction of arrow 170.

The fluid flowing in the direction of arrow 170 may pass through one of the guides, such as the guide 140. The fluid may pass through the open area 144 generally in the direction of arrow 174. As the fluid moves in the direction of arrow 174, the fluid engages an external surface 178 of the baffle 120 and generally flows around the baffle 120 and collects near a bottom 180 of the container 70. As the fluid passes over the surface 178 from the guide 140, any surfactants, such as soaps or selected surfactants or other sudsing or foaming materials may reduce or eliminate sudsing or bubble formation within the container 70. Without being bound by the theory, it is believed that while passing a fluid over the external surface 178 of the baffle 120 a motion or churning of the fluid is reduced, thereby reducing sudsing or the formation of a foam (e.g. bubbles within a material) within the container 70.

As fluid flows into the container 70 of the containment system 20, the flow control 96 may control a flow rate of the fluid through the outlet 94, generally in the direction of arrow 179, and into the initial sewer portion 100. As noted above, the fluid may flow into the container 70 at a first rate and flow out at a controlled second rate. The first rate (i.e. into the container) may be different, such as greater, than the second rate (i.e. out of the container 70). The operation of downstream systems, such as the grease interceptor 108, may therefore be operated in an efficient manner as the flow rate out of the container 70 due to the flow control 96 is substantially appropriate for the selected downstream system, such as the grease interceptor 108.

To assist in ensuring appropriate operation of selected systems and to resist overflow of the initial sewer system 100, the volume 72 of the container 70 of the system 20, may be great enough to contain most or all of the volume of the container 24. Therefore, the container 24 may be emptied at a selected time and at any rate, such as a rate greater than the operational capacity of the downstream system, such as the grease interceptor 108, without overflowing the initial sewer system portion 100. Further, the containment system 20 may eliminate or reduce sudsing or foam formation to reduce and/or eliminate back flow from the containment system 20 as well.

Figure 5:
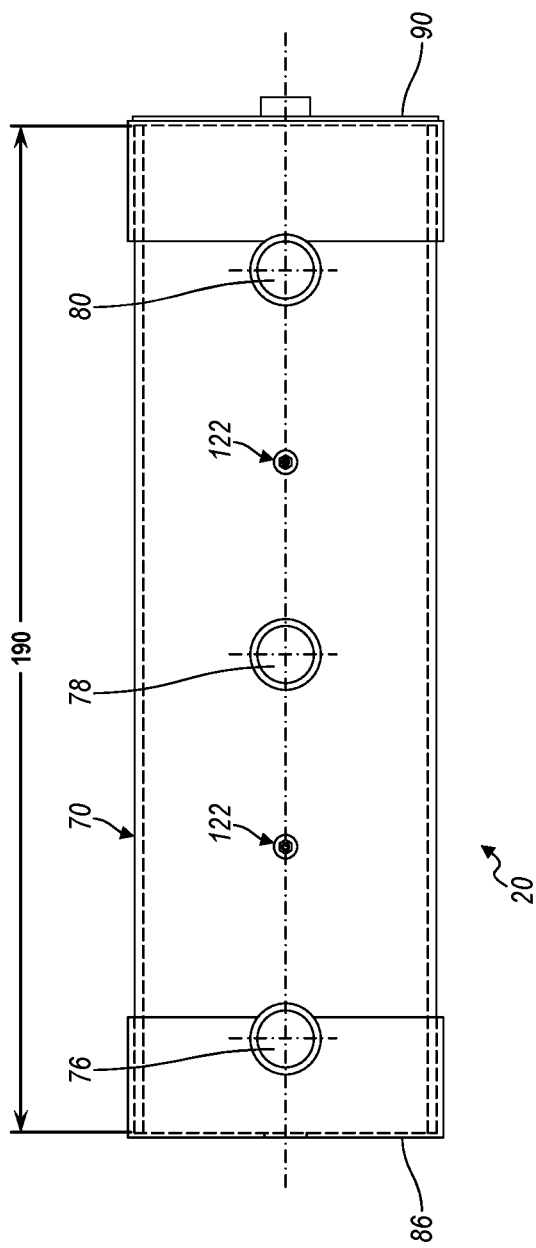
FIG. 5 is a top view of the abatement system of FIG. 1.

The containment system 20 may be formed of select material for various applications. For example, the container 70 may be formed of polyvinyl chloride (PVC) pipe that is generally cylindrical and, therefore, includes a selected diameter to achieve a selected volume. For example, the container 70 may be formed of PVC pipe having a diameter of about 30 centimeters (about 12 inches) and having a selected longitudinal length 190 (FIG. 5). The length 190 may be an appropriate length, for example, the length 190 may be about 100 centimeters to about 180 centimeters, further including about 100 centimeters to about 140 centimeters, and further including about 132 centimeters (about 52 inches). PVC pipe may be appropriate for various applications such as those including a discharge temperature of less than about 60° Celsius (C) (about 140° Fahrenheit (F)). The container 70, however, may be formed of other materials such as Aquatherm® polypropylene piping for discharge temperatures having a range of about 60° Celsius to about 80° Celsius. Further, the containment system 20 may be formed of other materials including stainless steel piping or material or brass or copper if a discharge temperature is above about 80° Celsius. Assembly materials may vary based upon the materials forming the containment system 20. For example, PVC solvent weld may be used for adhering and connecting PVC components. Other materials, such as metal materials, may be connected by welding or brazing. Other materials may also be connected to melting or melding.

Moreover, the containment system 20 may be assembled by assembling an end cap at two ends of a PVC pipe to achieve a selected length. In various embodiments, the end walls 86, 90 may be formed as PVC end caps. The container wall 71 may also be formed of a PVC pipe. PVC solvent/meld may be used to weld the caps to the pipe. In a selected embodiment, the container 70 may be formed of a first sized (e.g. about 30 cm) PVC pipe and the walls may be formed by appropriately sized PVC end caps (e.g., about 30 cm).

Figure 6:
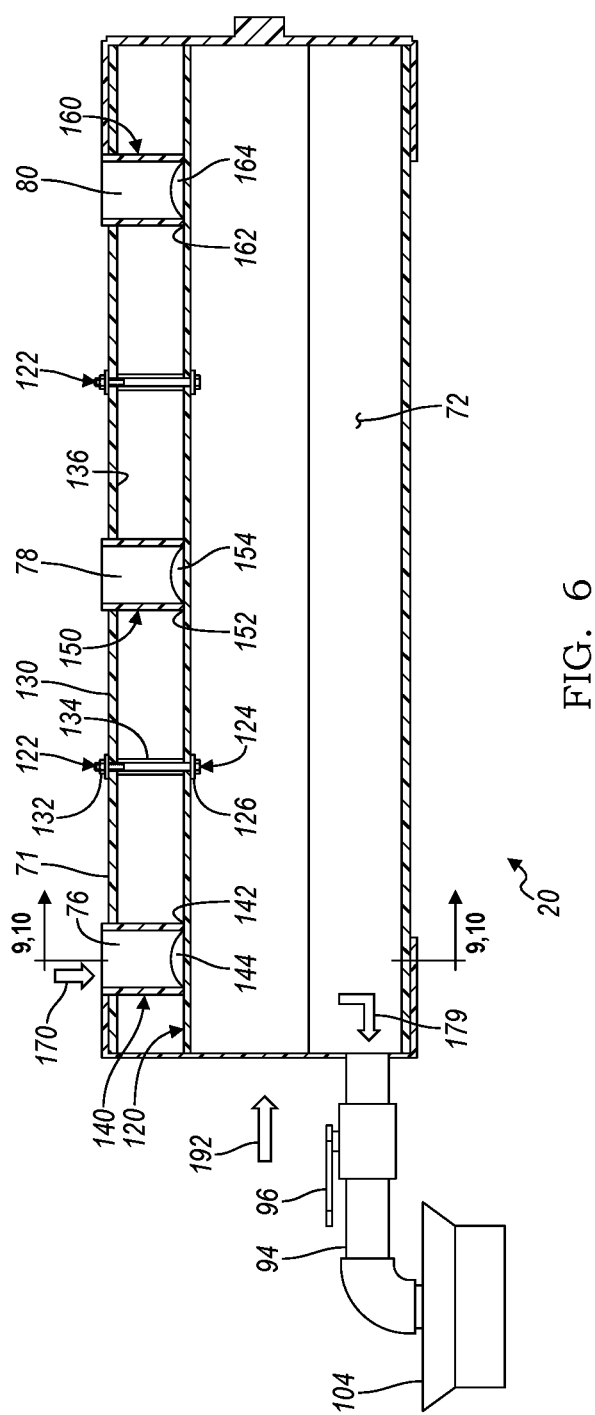
FIG. 6 is a cross-sectional view of the abatement system of FIG. 1 along a longitudinal line of FIG. 5.
Figure 7:
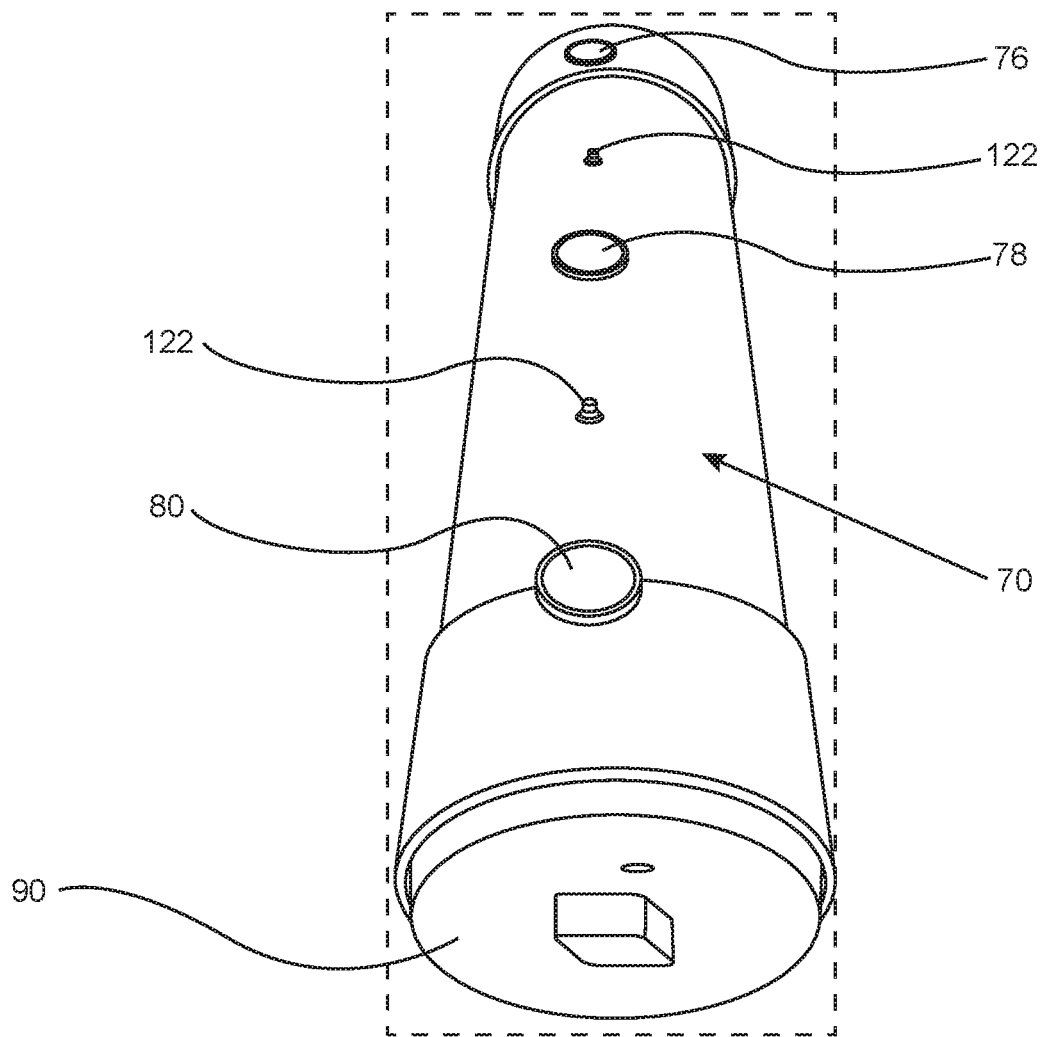
FIG. 7 is a top perspective view of the discharge containment and/or abatement system.
Figure 8:
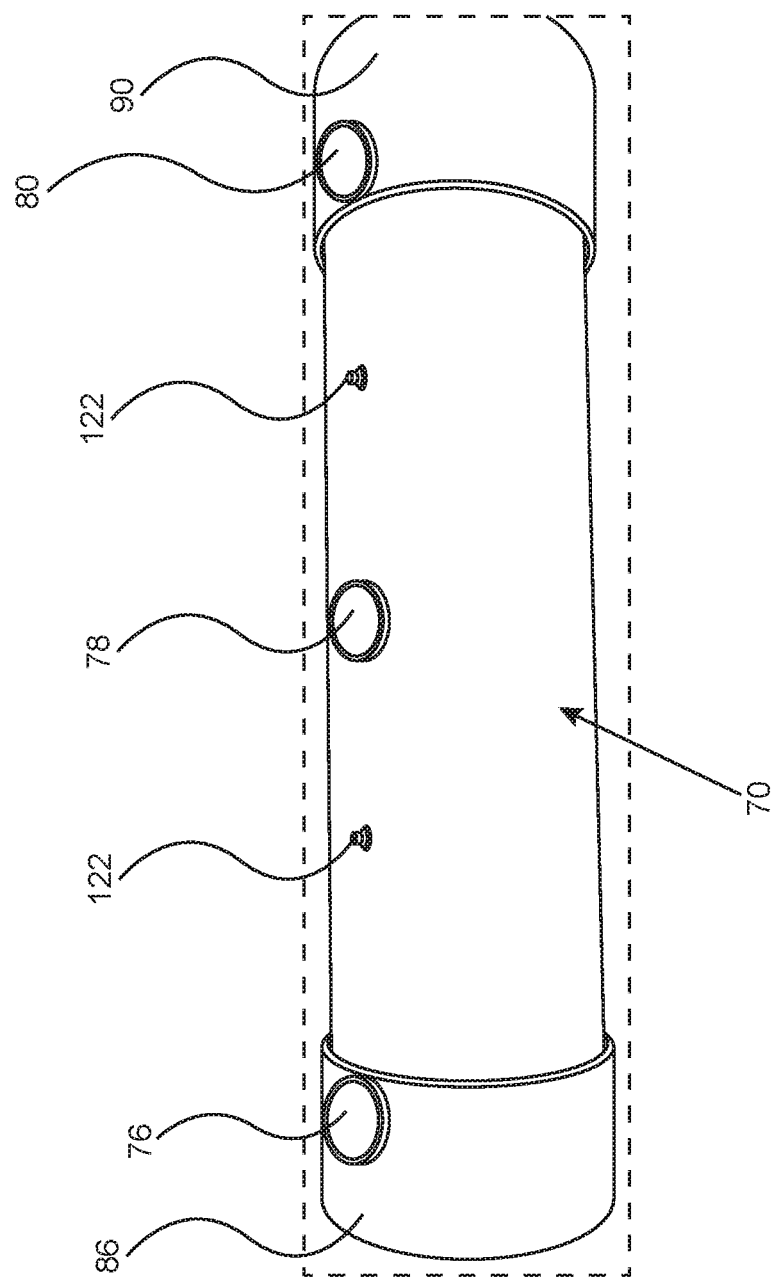
FIG. 8 is a perspective view of the discharge containment and/or abatement system.
Figure 9:
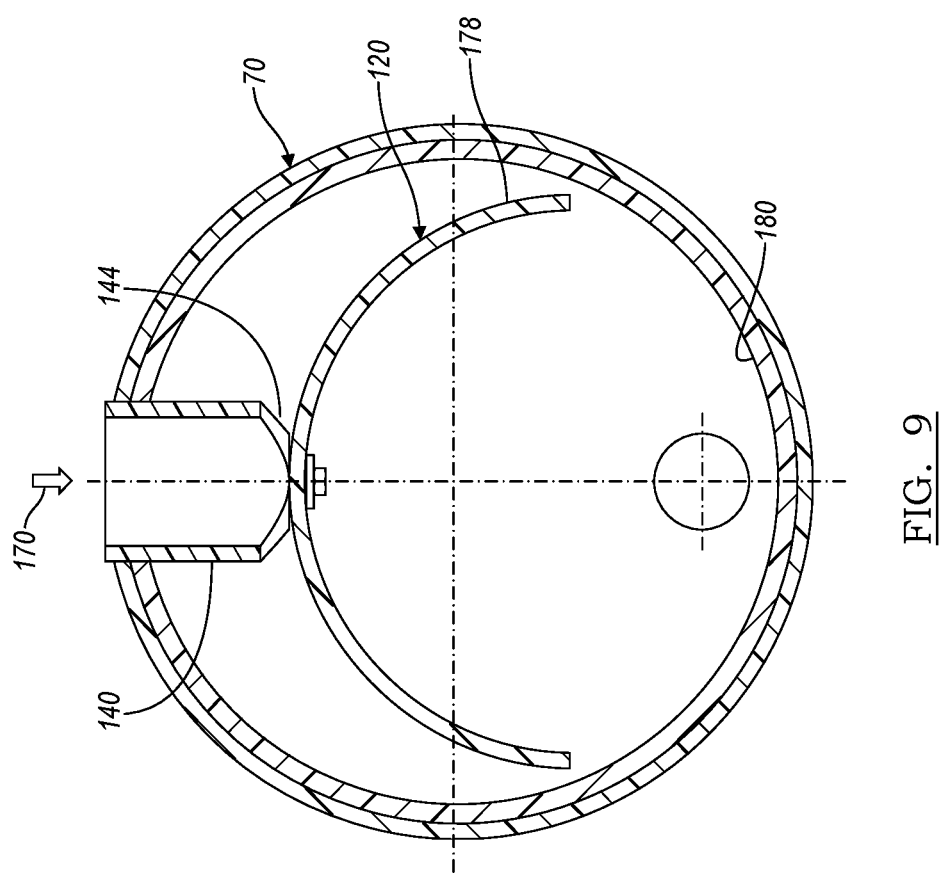
FIG. 9 is a cross-section view of the abatement system taken along line 9, 10-9, 10 of FIG. 6.
Figure 10:
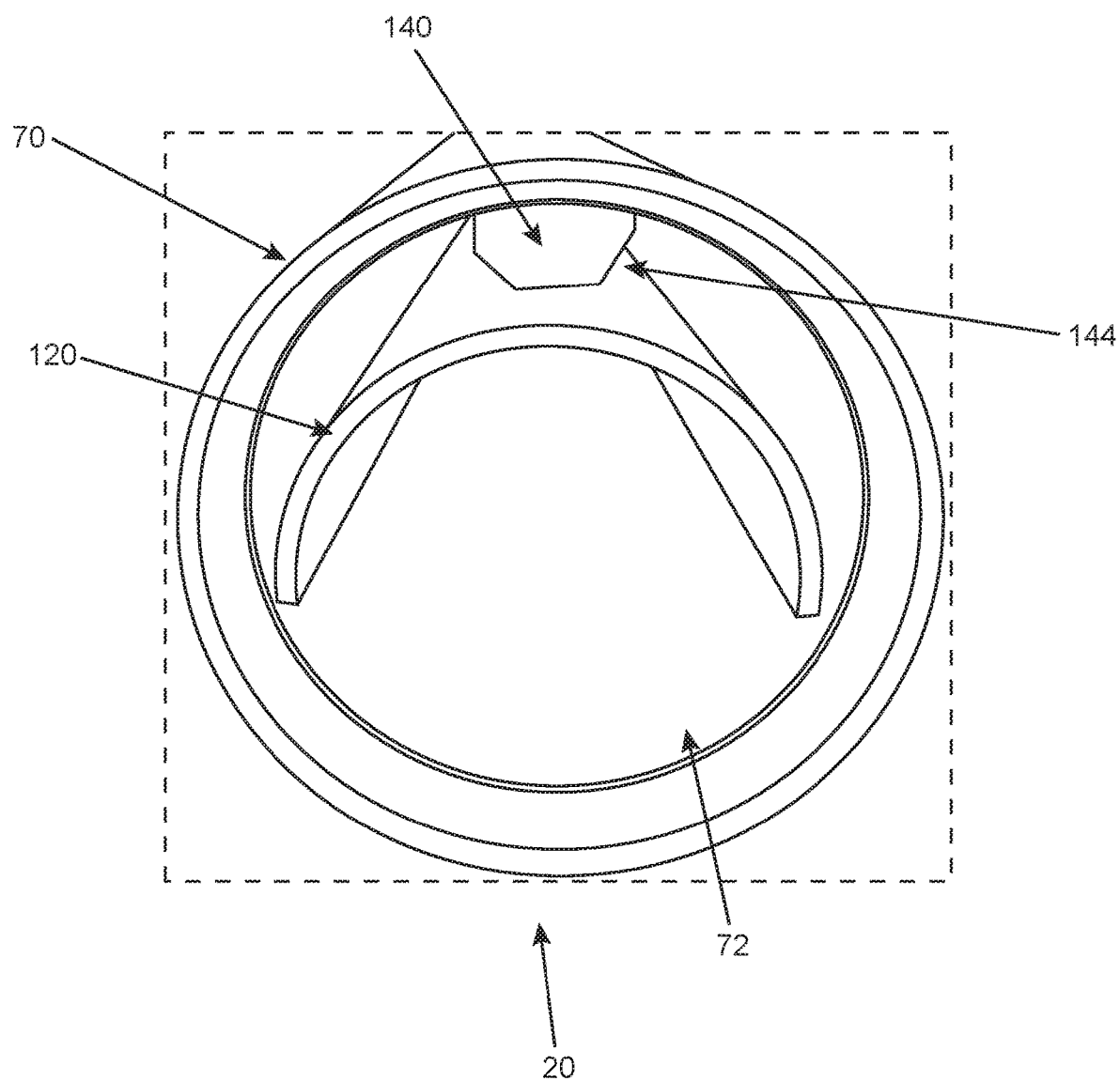
FIG. 10 is a cross-section view of the abatement system taken along line 9, 10-9, 10 of FIG. 6.

The baffle 120 may be formed by cutting a PVC pipe of a diameter smaller than the pipe of the container wall 71. For example, the baffle 120 may be about a 25 cm in diameter pipe. The cute pipe may be moved into the container 70, such as generally in the direction of arrow 192 (FIG. 6).

Once positioned the, hanger assembly 122 may then be connected to assemble the baffle 120 to the external container wall 71 of the container 70 of the container system 20.

Figure 11:
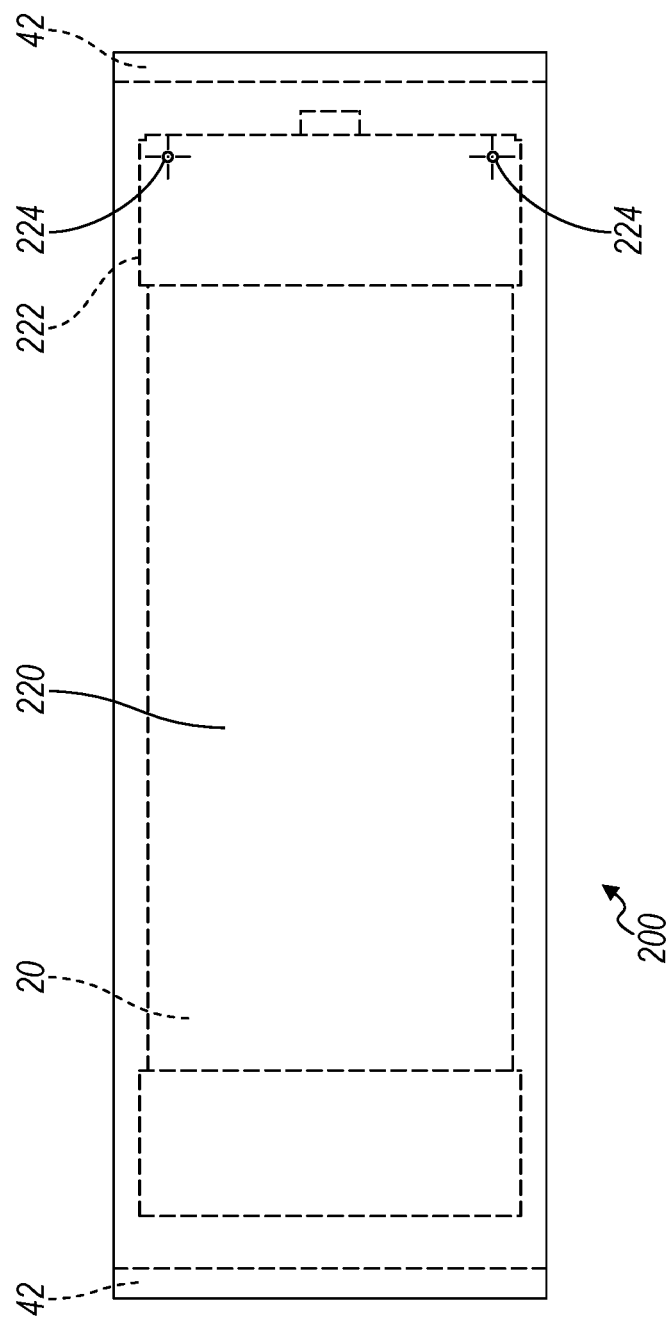
FIG. 11 is a front elevational view of a shroud.
Figure 12:
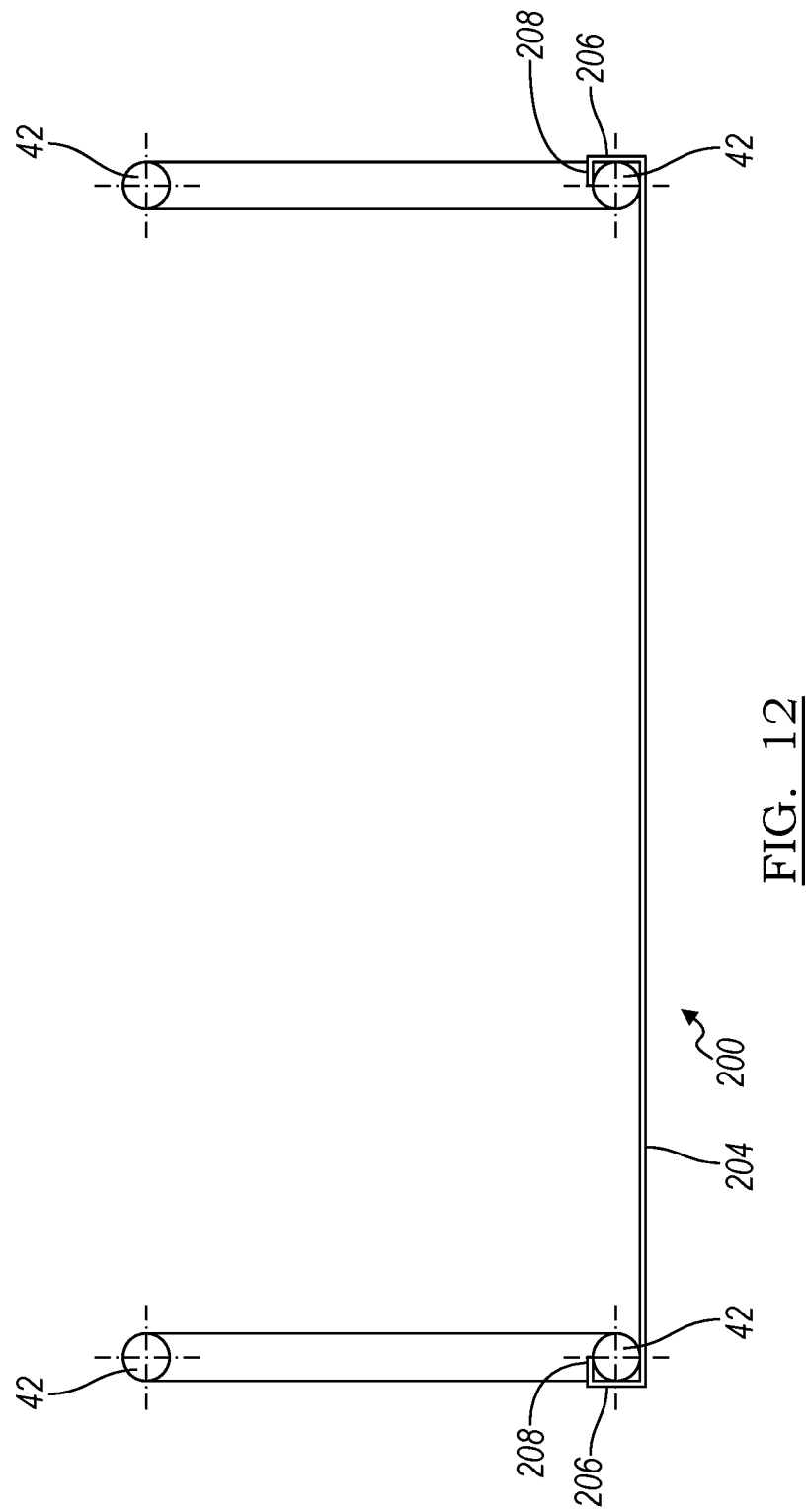
FIG. 12 is a top view of the shroud of FIG. 11.

In various embodiments, with reference to FIG. 1 and reference to FIGS. 11 and 12, a cover or shroud 200 may be used. The shroud 200 includes a front face or surface 204 extending generally between at least two of the legs or supports 42 of the container 24. Side walls 206 extend at about 90 degrees from the front wall 204 and further include return or third walls 208 that extend at about 90 degrees to the side wall 206.

The shroud 200 may then be installed around the legs 42 by engaging the side wall 206 and return wall 208 around the legs 42. The shroud 200 may be bent to move the return walls 208 around the legs 42 and then released to such that a snap or spring fit engages the legs 42. The shroud 200, as illustrated in FIG. 11, may cover the containment system 20. It is understood that the shroud 200 is exemplary and optional and not required for operation installment of the containment system 20.

Further, the shroud 200 may be formed as more than one piece including a main or elongated first piece 220 and a second or smaller piece 222. The two base pieces may positioned around respective legs 42 of the container 24 and connect it with connectors 224 that pass through openings or passages in each of the two members 220 and 222. Therefore, it is understood that the shroud 200 may be assembled and installed in an appropriate manner, but may be provided to cover the containment system 20.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A discharge abatement system, comprising:
an abatement container having a first length along an axis between a first end and a second end;
an internal baffle extending along the first length between the first end and the second end;
an inlet configured to direct a fluid from a storage volume into the abatement container and onto the internal baffle;
an abatement outlet to direct a flow of at least a portion of the fluid from the abatement container to an initial sewer line portion; and
a fluid directing member extending from the inlet toward the internal baffle to direct a flow of fluid to engage the internal baffle;
a flow controller to control the flow of at least the portion of the fluid from the abatement container to the initial sewer line portion;
wherein the fluid directing member includes a terminal end having a first portion to substantially contact the internal baffle and a second portion that is open relative to the internal baffle and the second portion is generally scalloped.

2. The system of claim 1, wherein the abatement container has a volume equal to or greater than the storage volume.

3. The system of claim 1, wherein the internal baffle is fixed within the abatement container and placed at least partially between the inlet and the abatement outlet.

4. A method of discharge abatement, comprising:
passing a fluid volume through an inlet into an abatement container having a first length along an axis between a first end and a second end;
engaging an internal baffle in the abatement container with the fluid volume prior to the fluid volume exiting the abatement container, wherein the internal baffle extends along the first length between the first end and the second end;
directing the passed fluid volume toward the internal baffle through a directing member;
providing the directing member to have a terminal end with a first portion to contact the internal baffle and a second portion open relative to the internal baffle; and
controlling an outflow of the fluid volume as the fluid volume exits the abatement container to an initial sewer line portion;
wherein the internal baffle extends between a first end and a second end of the abatement container.

5. The method of claim 4, wherein the fluid volume is received at a first rate and the fluid volume outflows at a second rate;
wherein the second rate is less than the first rate.

6. The method of claim 4, further comprising:
configuring the internal baffle to limit foaming within the abatement container at least by engaging the internal baffle by the fluid volume.

7. The method of claim 4, further comprising:
operating a grease trap in a portion of the sewer line in a selected manner due at least to the controlling the outflow of the fluid volume.

8. The system of claim 3, wherein the internal baffle is suspended below the inlet and coupled to an abatement container wall.

9. The system of claim 1, wherein the abatement container is cylindrical and extends from the first end to the second end.

10. The system of claim 9, further comprising:
a stabilizing system having a member;
wherein the member includes a first wall to engage a surface and a second wall that is configured to contact an outer surface of the abatement container.

11. The method of claim 4, further comprising:
providing the internal baffle between a top of the abatement container and a bottom of the abatement container.

12. A discharge abatement system, comprising:
an abatement storage container having an upper portion and a lower portion both extending between a first end wall and a second end wall and defining an internal storage volume configured to temporarily contain a volume of a fluid;
an inlet bore through the upper portion configured to allow flow of a fluid from a source fluid volume to the internal storage volume;
an elongated baffle having a first surface extending between the first end wall and the second end wall and positioned between the upper portion and the lower portion within the internal storage volume;
a fluid directing member extending from the inlet bore toward the first surface of the elongated baffle to direct a flow of the fluid to engage the elongated baffle, wherein the fluid directing member has a scalloped terminal end such that a first portion is configured to contact the first surface of the elongated baffle and a second portion that is spaced a distance from the first surface of the elongated baffle;
an abatement outlet to direct a flow of at least a portion of the volume of fluid from the abatement container to an initial sewer line portion; and
a flow controller to control the flow from the abatement container to an initial sewer line portion;
wherein a substantial portion of the volume of the fluid entering the abatement container through the inlet engages the elongated baffle prior being directed to the initial sewer line portion;
wherein the source fluid volume is greater than the internal storage volume.

13. The system of claim 12, wherein a first surface of the elongated baffle is curved and is initially engaged by a flow of the fluid from the inlet bore.

14. The system of claim 12, wherein the elongated baffle is fixed within the abatement container and displaced at least partially between the inlet and the abatement outlet.

* * * * *